INVENTOR.
LUDWIG WESCH

BY

AGENT

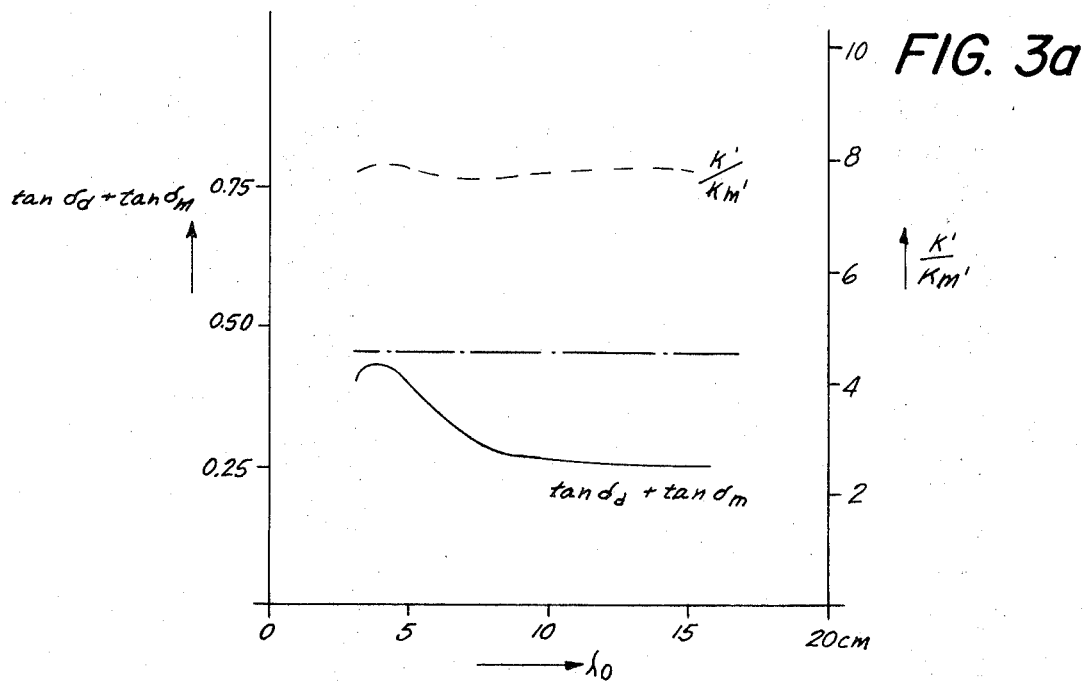
FIG. 3a
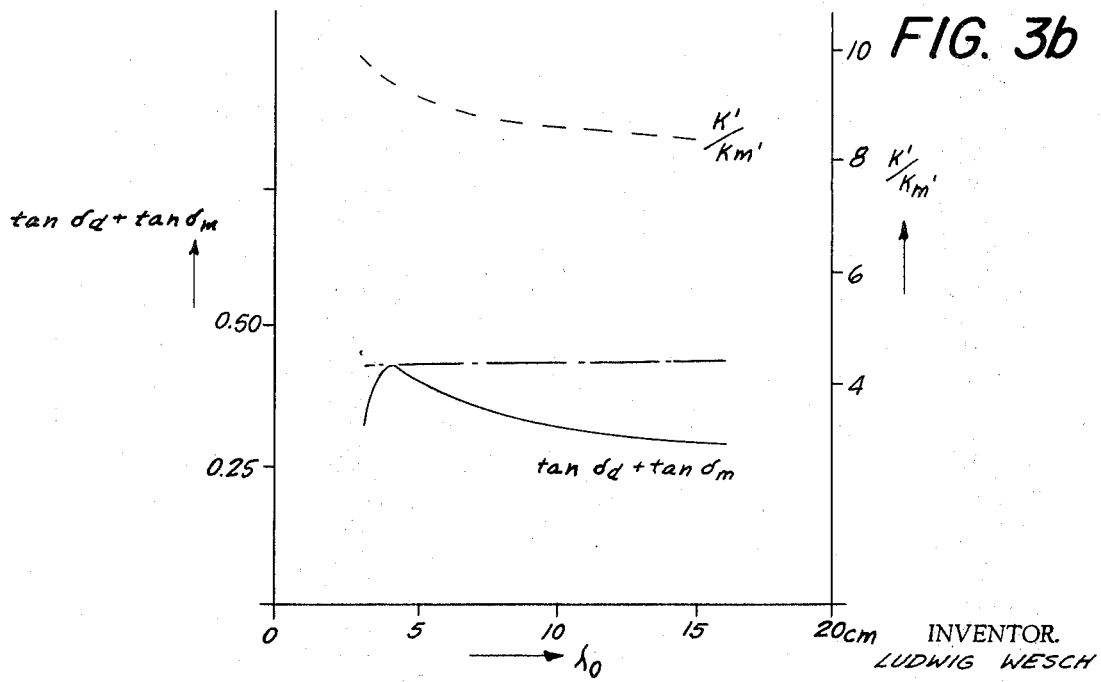
FIG. 3b
INVENTOR.
LUDWIG WESCH
BY
AGENT

United States Patent Office
3,526,896
Patented Sept. 1, 1970

3,526,896
RESONANCE ABSORBER FOR ELECTRO-
MAGNETIC WAVES
Ludwig Wesch, Schlosswolfsbrunnenweg 10,
Heidelberg, Germany
Continuation-in-part of application Ser. No. 505,826,
May 3, 1955. This application Feb. 2, 1961, Ser.
No. 86,824
Int. Cl. H01q 17/00
U.S. Cl. 343—18                                       14 Claims

ABSTRACT OF THE DISCLOSURE

An electromagnetic wave absorber consists of a reflecting base layer and a superposed absorbing layer. The absorbing layer has a thickness which is equal to an odd number of quarter wavelengths of the energy to be absorbed divided by the geometric mean of the relative dielectric constant and the relative magnetic permeability of the absorbing layer material.

---

This is a continuation-in-part of my application Ser. No. 505,826, filed May 3, 1955, now abandoned.

The present invention relates to improvements in electromagnetic wave absorbing devices, and more particularly to a dielectric wall for absorbing electromagnetic waves by interference.

As is known, a resonance absorber comprises a wave reflecting base layer and an absorber layer superimposed on the base layer, the absorber layer having a partially reflective outer surface whereon the electromagnetic waves are to be impinged and whereon one portion of the impinging wave beam is reflected, the other portion of the impinging wave beam penetrating into the absorber layer and being reflected by the base layer. Leaving the layer at its outer surface, the second beam portion interferes with the first beam portion of the radiation and if the two beam portions match, they cancel each other in amplitude and phase whereby the radiation is essentially absorbed.

It is an object of the present invention to provide an improved broadband wave absorber wall which very strongly reduces electromagnetic wave reflection in a wide band of frequency and which also has mechanical properties making the absorber useful for a great variety of applications.

It is a more particular object of this invention to provide very thin electromagnetic wave absorbing layers which almost completely eliminate reflection, such layers being applicable as coatings for any desired object, such as ships, airplanes, rockets, missiles highways, pulp sheets, roofing, packaging material sheets, camoflaging nets and the like.

In the resonance absorber of the present invention, the absorber layer applied to the reflecting base layer has a predetermined high relative dielectric constant and a high relative magnetic permeability. The product of the two parameters of the entire absorber wall may be greater than 3, preferably greater than 6. If the average value of the product $k'k_m'$ of the whole absorber wall is greater than 3, its thickness may be smaller than $\lambda_0/7$. The thickness $h$ of the absorber layer is defined by the following equation $$h = \frac{(2n-1)\lambda_0}{4\sqrt{k'k_m'}} \quad (I)$$

wherein $n$ is any positive integer, $\lambda_0$ is the wavelength in free space, $k'$ is the relative dielectric constant and $k_m'$ is the relative magnetic permeability.

In order to obtain wave extinction over a broad frequency band, a material has to be used whose high-frequency constants $k'$ and $k_m'$ satisfy the equation $$k' \cdot k_m' = \text{const } \lambda_0^x \quad (II)$$

wherein, const$=(\frac{1}{4}h)^2$ if $n$ is 1 and wherein $x$ is a correction factor without dimension compensating for tolerable deviations of the extinction of the radiation in the absorber.

Since the thickness $h$ is always constant, $k' \cdot k_m'$ has to vary according to the square of the wavelength. However, considering a remaining reflection of 20 to 30% tolerable, a variation of $\lambda_0^x$ is sufficient, $x$ being between 1.2 to 1.8. With the variation of $k' \cdot k_m'$ in dependency on the wavelength also the losses change, too, so that the following final equation is obtained:

$$\tan \delta_d fy(\lambda) + \tan \delta_m fy(\lambda) = \frac{4}{\pi} \coth^{-1} \sqrt{\frac{k' fy(\lambda)}{k_m' fy(\lambda)}} \quad (III)$$

wherein $fy(\lambda)$ is a function of the dependency of the high-frequency characteristics on the wavelength in such a way that the equation is satisfied for all wavelengths in the frequency band tan $\delta_d$ being the dielectric loss tangent, tan $\delta_m$ being the magnetic loss tangent and coth$^{-1}$ being the inverse hyperbolic cotangent. These conditions may be achieved only by specially compounded materials from which the absorber layer is prepared.

The novel absorber layer materials of my invention consist of a dielectric binder containing at least one filler controlling the high-frequency characteristics $k'$, $k_m'$, tan $\delta_d$ and tan $\delta_m$ of said material, said filler being present in such an amount and having such a grain size and grain form that, for the high-frequency characteristics $k'$ and $k_m'$ in the whole layer, the equation $$k' \cdot k_m' = \text{const } \lambda_0^x \quad (II)$$

is satisfied. According to the invention, such a filler consists of mixed crystals composed of at least one ferric-oxide-containing component selected from the group consisting of $rD \cdot Fe_2O_3$ and $rE \cdot Fe_2O_3$, $r$ being an integer selected from 1 and 2, D being an oxide of a heavy metal selected from the group consisting of Zn, Cd and Hg, and E being an oxide of an earth alkali metal selected from the group consisting of Mg, Ca, Sr and Ba, and a second component containing at least one oxide selected from the group consisting of $sNiO$, $sCoO$, $sMnO$, $sFeO$ and $sFe_2O_3$, $s$ being any number from 0.1 to 13 and the sum of the numbers $s$ not exceeding 26. The mixed crystals may contain 10–40%, preferably 15–20%, of the first ferric oxide-containing component. For instance, the mixed crystals may be composed of $ZnO \cdot Fe_2O_3$ and $2FeO \cdot 3Fe_2O_3$.

The absorber according to my present invention may comprise a single absorber layer which is determined by the above-mentioned equations or it may comprise two or more layers with different high-frequency characteristics which are determined by the fact that the whole laminate comprising all layers together corresponds to the above-mentioned Equations II and III.

The absorber layer may be applied to a support sheet which may be the reflecting base layer by brushing or spraying or the like or it may, for example, be a thermoplastic resin and possibly a vulcanizable material. A plurality of such absorber layers may be laminated in a suitable manner before being applied to said support sheet, e.g. by means of an adhesive.

My present invention will be further understood from the following description in connection with the accompanying drawings showing examples, which in no way limit the preset invention thereto.

In the drawings:

FIGS. 3, 3a and 3b are diagrams showing the reflection by different layers according to my invention explained in the examples, in dependency on their high-frequency constant over a wide frequency band.

Figure 1:
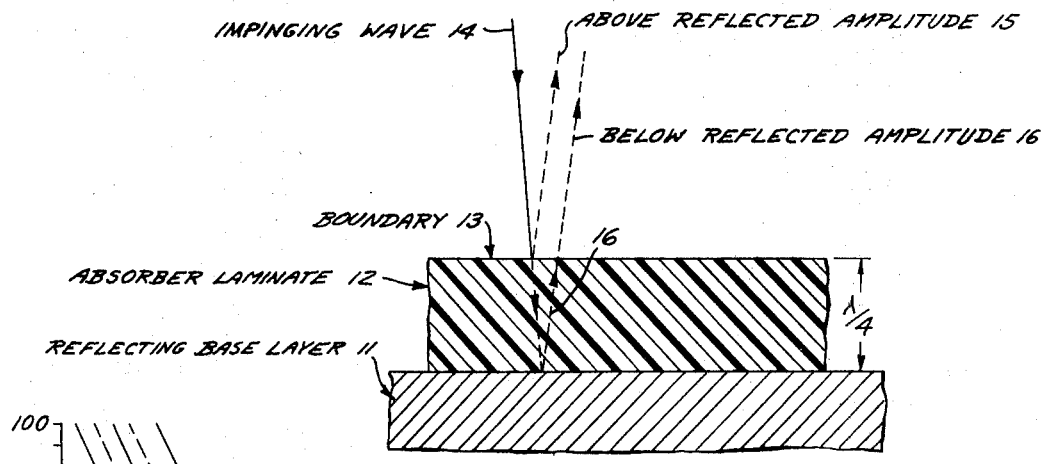
FIG. 1 shows the path of a wave impinging on the absorber.

FIG. 1 shows an absorber according to the invention consisting of a layer 12 which is combined with a metallic base 11. The outer surface 13 of the layer 12 directed to the source of radiation forms the boundary layer against free space. The incident wave 14 is partly reflected at this boundary layer and partly penetrates into the layer 12. The wave may impinge at any angle, for instance vertically.

Part 15 of the wave 14 which is reflected at the surface is less than half of the radiation. The other part 16 of the wave 14 which has penetrated into the laminate passes through the layer 12 to the reflecting surface of layer 11 and is reflected so that it runs back again through the layer 12 and emerges through the boundary layer 13 into free space. In this way, part 16 of wave 14, having had more than half the energy of the impinging wave 14 when entering the boundary layer 13, is reduced by attenuation in the layer material and, therefore, becomes also less than half of the wave 14 on account of this partial extinction in the layer 12.

By adjusting the material of layer 12 according to the invention as mentioned above to the conditions of the above-mentioned equations and, the degree of reflection at the boundary surface 13 and the degree of attenuation in layer 12 are matched in such a manner that wave part 15 which is reflected at the boundary surface and wave part 16 again emerging from the layer have equal amplitudes and opposite phases after leaving the laminate and thus interfere so that the wave is extinguished.

Figure 2:
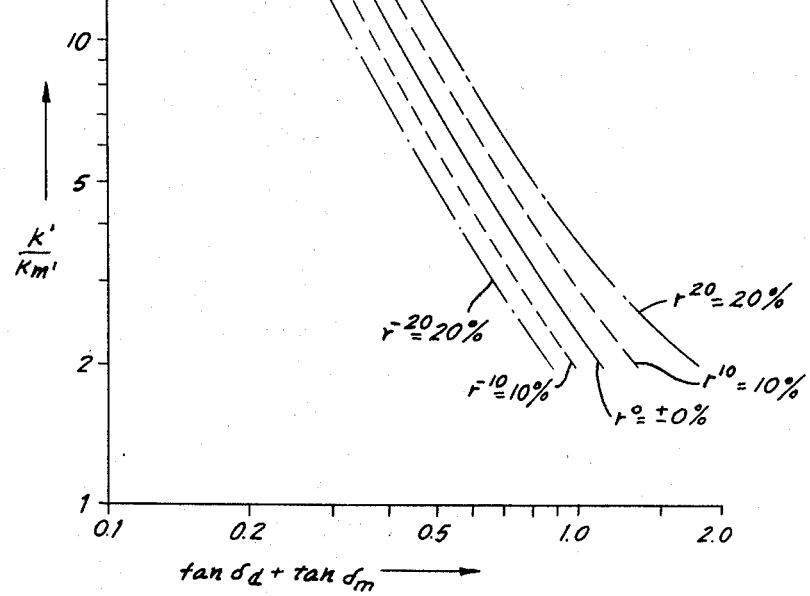
FIG. 2 is a diagram showing schematically the total reflection of a beam impinging on the absorber in dependence on the variable values of the left and right members of Equation III.
Figure 2:
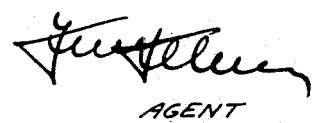

FIG. 2 shows a diagram illustrating the whole reflection "$r$" of an absorber according to my invention by percent of the impinging radiation of a specific wavelength. On the horizontal axis of the diagram the left member and on the vertical axis the right member of above-mentioned Equation III is indicated. $r^0$ designates the curve of a 100% extinction, i.e. of a reflection $r=0$ drawn in solid lines, whereas the broken lines show the curves $r_{10}$, $r_{20}$ and $r_{-10}$, $r_{-20}$ for a 10% and 20% reflection of the whole layer, i.e. a 90% and 80% extinction of the wave 14 impinging onto the layer as shown in FIG. 1. A residual reflection of 20% to 30% of the radiation impinging to the absorber is considered as tolerable according to the present state of art.

The layer applied to the reflecting base layer consists of a suitable binder, e.g. synthetic or natural rubber, plastics or the like, in which a granular or pulverulent filler material is embedded, the filler material controlling the permeability and the dielectric constant of the absorber layer.

The binder may be selected from the materials listed in Arthur R. von Hippel's "Dielectric Materials and Applications," The Technology Press of M.I.T. and John Wiley & Sons, Inc., New York 1954, and "Dielectric and Waves," John Wiley & Sons, Inc., New York, 1954, which also provide the required dielectric properties of the materials, including their loss tangents at given frequencies. Synthetic resins particularly synthetic rubbers, such as butyl and butadiene-base rubbers, may be used, but also materials suitable for different purposes, such as mortar, concrete, bitumen, cardboard pulp or any other material, the only requirement being that it has a relative dielectric constant of between 1.5 and 10 and a dielectric loss tangent smaller than 0.1.

The following are examples of useful components of mixed crystals within the scope of this invention:

$CoO.Fe_2O_3$,
$NiO.Fe_2O_3$,
$CoO.NiO.2Fe_2O_3$,
$3(CoO.NiO).4(Fe_2O_3)$,
$2(CoO.NiO.FeO).4(Fe_2O_3)$,
$3(CoO.NiO.FeO).5(Fe_2O_3)$ and
$3(CoO.NiO.FeO).0.1(MnO).5.1(Fe_2O_3)$.

The fillers may be present in the layer compound in an amount of 2.5% to 90% by weight, based on the total weight of the material.

Dipoles may also be embedded in the absorber. These dipoles may be made of a material which has an electric conductivity and an electric resistance such as metals with a high electric conductive resistance (which may also have magnetic losses), especially such as metal filaments having a mono-crystalline structure, named "whiskers," or plastic filaments, which are coated with metals such as nickel, iron or equivalent or carbon black or graphite or other electrically conductive materials. The dipoles may also be made of an electrically conductive plastic compound. The length L of the dipoles is given by the equation $$L = \frac{\lambda_0}{2\sqrt{k' \cdot k_m'}} \tag{IV}$$

The length of the dipoles may be selected so that all wavelengths of a wide frequency band may be effected. Different kinds of dipoles may be used singly or in such a manner that at least 5% of the same dipoles are mixed with other kinds of dipoles.

The following examples describe some compounds of a layer material according to my present invention, which balance Equation III and effect sufficient extinction of the impinging waves of a wide frequency band.

EXAMPLE I

In 10 parts by weight of a binder consisting of butadiene acrylonitrilic rubber which contains 33% of acrylonitrile the following filler is embedded:

80 parts by weight of a powder consisting of mixed crystals compounded of 59.3% by weight of $(2CoO.0.7MnO.0.3NiO.10FeO.13Fe_2O_3)$ 25% by weight of $ZnO.Fe_2O_3$ and 15.7% by weight of $BaO.Fe_2O_3$.

Further the following materials are added:

|   | Parts by wt. |
|---|---|
| A diisocyanate (as manufactured under the trade name "Desmodur TT" by Bayer, Leverkusen, Germany) | 0.90 |
| Zno | 0.50 |
| Stearic acid | 0.60 |
| Paraffin | 0.40 |
| Sulfur | 0.40 |
| Coumarone resins medium hard | 2.00 |
| A known accelerator (manufactured under the trade name "Vulkacit B" by Bayer, Leverkusen, Germany) | 0.20 |

An absorber layer manufactured from these materials has the following high-frequency constants:

$k'=10.0$ and $k_m'=1.25$ at a wavelength of $\lambda_0=3.2$ cm.,
$k'=11$ and $k_m'=1.4$ at a wavelength of $\lambda_0=10$ cm.

Figure 3:
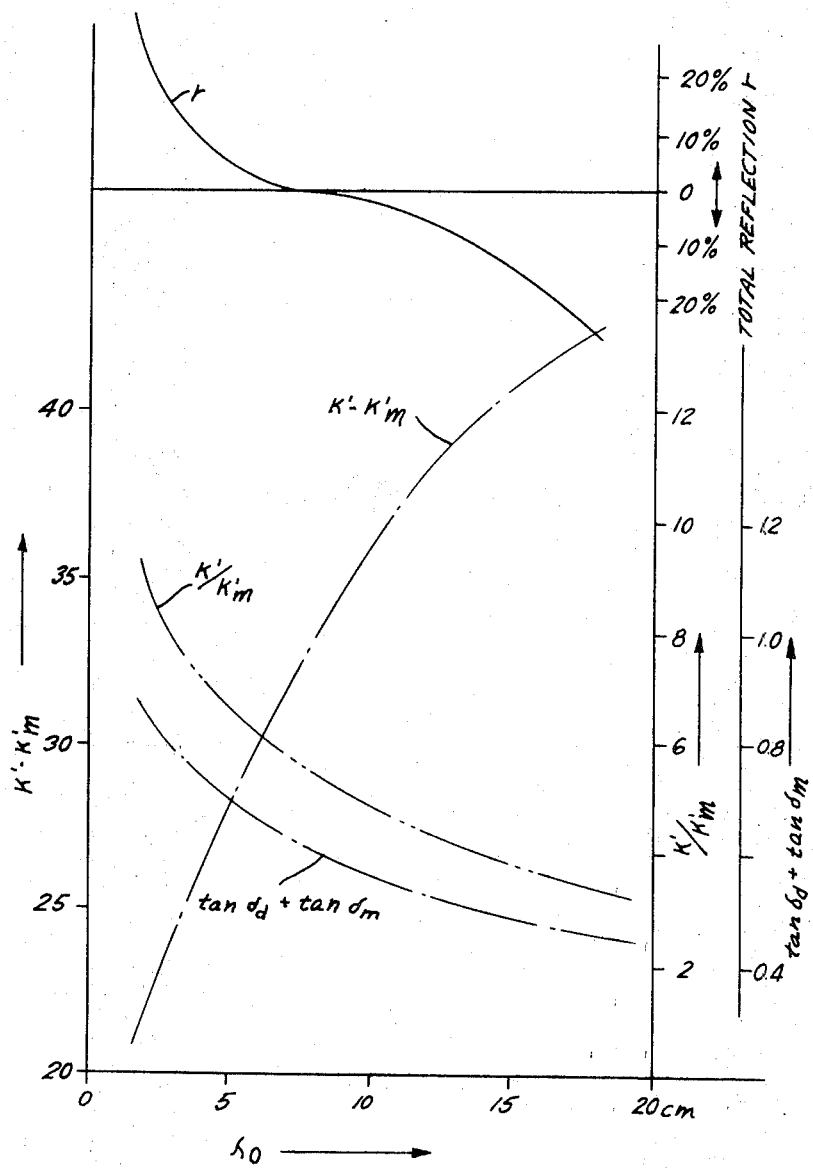

These values show that the high-frequency constants constantly increase with the wavelength, i.e. that the conditions of above-mentioned equations are fulfilled (see FIG. 3a).

EXAMPLE II

In 19 parts by weight of a binder according to Example I the following filler is embedded:

76 parts by weight of a powder consisting of mixed crystals compounded of 85% by weight of (2FeO.3Fe$_2$O$_3$) and 15% by weight of ZnO.Fe$_2$O$_3$.

Further the following materials are added:

| | Parts by wt. |
|---|---|
| "Desmodur TT" as mentioned in Example I | 0.90 |
| Zno | 0.50 |
| Stearic acid | 0.60 |
| Paraffin | 0.40 |
| Sulfur | 0.40 |
| Coumarone resin medium hard | 2.00 |
| A known accelerator (as manufactured under the trade name "Vulkacit B" by Bayer, Leverkusen, Germany) | 0.20 |

An absorber layer manufactured from these materials has the following high-frequency constants:

$k'=10.5$ and $k_m'=1.0$ at a wavelength of $\lambda_0=3.2$ cm., $k'=10.5$ and $k_m'=1.2$ at a wavelength of $\lambda_0=10$ cm.

These values show that the high-frequency constants constantly increase with the wavelength, i.e. that the conditions of above mentioned equations are fulfilled (see FIG. 3b).

In the embedding mass consisting of—

| | Parts by wt. |
|---|---|
| A known modified alkyd resin (as manufactured under the trade name "Desmophen 1100" by Bayer, Leverkusen, Germany) | 9.11 |
| A known modified alkyd resin (as manufactured under the trade name "Desmophen 800" by Bayer, Leverkusen, Germany | 2.8 |
| A chlorinated diphenyl (as manufactured under the trade name "Clophen A 60" by Bayer, Leverkusen, Germany) | 2.34 |
| A xylene formaldehyde resin (as sold under the trade name "XFN" by Bayer, Leverkusen, Germany) | 3.47 |
| Butyl ethyl acetate | 6.93 |
| Toluene | 13.2 |
| Collodion cotton (as manufactured under the trade name "E 950" by Bayer, Leverkusen, Garmany) | 2.18 | the following filler is embedded:

55 parts by weight of a powder consisting of mixed crystals compounded of 70% by weight of (2FeO.3Fe$_2$O$_3$) and 30% by weight of (ZnO.Fe$_2$O$_3$).

It is obvious from the above description that, while certain synthetic resins in certain combinations have been exemplified, many other combinations are possible by substituting other resins listed hereinabove, as well as resins equivalent thereto. Since it is equally possible to vary the filler materials and percentages, thousands of different layers may obviously be formed within the scope of the disclosed invention.

While the invention has been described in connection with some preferred embodiments, it will be clearly understood that many modifications and changes may be effected without departing from the spirit and scope of the invention as defined in the appended claims.

What I claim is:

1. An electromagnetic wave absorber for absorbing impinging electromagnetic waves by interference, comprising (1) a wave reflecting base layer and (2) an absorber layer superimposed on the base layer, the absorber layer having a partially reflective outer surface whereon the electromagnetic waves are to be impinged and whereon one part of the impinging waves is reflected, the other part of the impinging waves penetrating into the absorber layer and being reflected by the base layer, the absorber layer having a thickness $h$ defined by the following equation $$h = \frac{(2n-1)\lambda_0}{4\sqrt{k'k_m'}}$$

wherein $n$ is any positive integer, $\lambda_0$ is the wavelength in free space, $k'$ is the relative dielectric constant of the absorber layer material and $k_m'$ is the relative magnetic permeability of the absorber layer material, said absorber layer consisting of a binder containing at least one granular filler controlling the high frequency characteristics $k'$, $k_m'$, tan $\delta_d$ and tan $\delta_m$, tan $\delta_d$ and tan $\delta_m$ being the dielectric and magnetic loss tangents, respectively, the filler being present in such an amount and having such a grain size and grain form that the high frequency characteristics $k'$ and $k_m'$ of the absorber layer satisfy the equation $$k'k_m' = \text{const } \lambda_0^x$$

wherein const is a constant equal to $(\frac{1}{4}h)^2$ and the exponent $x$ is a dimensionless correction factor compensating for tolerable deviations from the full wave absorption of the absorber, and said filler consisting of a mixed crystal composed of at least one ferric oxide-containing component selected from the group consisting of $rD.\text{Fe}_2\text{O}_3$ and $rE.\text{Fe}_2\text{O}_3$, $r$ being an integer selected from 1 and 2, D being an oxide of a heavy metal selected from the group consisting of Zn, Cd and Hg, and E being an oxide of an earth alkali metal selected from the group consisting of Mg, Ca, Sr and Ba, and a second component containing at least one oxide selected from the group consisting of $s$NiO, $s$CoO, $s$MnO, $s$FeO and $s$Fe$_2$O$_3$, $s$ being any number from 0.1 to 13 and the sum of the numbers $s$ not exceeding 26.

2. The electromagnetic wave absorber of claim 1, wherein the amount and composition of said filler is such that said high frequency characteristics of the absorber layer are determined by the equation $$\tan \delta_d fy(\lambda) + \tan \delta_m fy(\lambda) = \frac{4}{\pi} \coth^{-1} \sqrt{\frac{k'fy(\lambda)}{km'fy(\lambda)}}$$

wherein $fy(\lambda)$ constitutes the dependency of the high frequency characteristics on the wavelength so as to satisfy the latter equation for all wavelengths in the frequency band to be absorbed and $\coth^{-1}$ is the inverse hyperbolic cotangent.

3. The electromagnetic wave absorber of claim 2, wherein the mixed crystal contains 10% to 40% of the first ferric oxide-containing component.

4. The electromagnetic wave absorber of claim 3, wherein the mixed crystal contains 15% to 20% of the first ferric oxide-containing component.

5. The electromagnetic wave absorber of claim 2, wherein the sum of the dielectric and magnetic loss tangents of the binder is below 0.1 throughout the frequency band to be absorbed.

6. The electromagnetic wave absorber of claim 5, wherein the binder is synthetic rubber.

7. The electromagnetic wave absorber of claim 5, wherein the binder is concrete.

8. The electromagnetic wave absorber of claim 5, wherein the binder is mortar.

9. The electromagnetic wave absorber of claim 5, wherein the binder is bitumen.

10. The electromagnetic wave absorber of claim 5, wherein the binder is tar.

11. The electromagnetic wave absorber of claim 2, further comprising dipoles embedded in said absorber layer, the length L of the dipoles being determined by the formula $$L = \frac{\lambda_0}{2\sqrt{k'km'}}$$

12. The electromagnetic wave absorber of claim 2, wherein said heavy metal is zinc and said earth alkali metal is barium.

13. The electromagnetic wave absorber of claim 2, wherein said mixed crystal is composed of 2FeO.3Fe$_2$O$_3$ and ZnO.Fe$_2$O$_3$.

14. The electromagnetic wave absorber of claim 2, wherein the absorber layer has a $k'=10.5$ and $k_m'=1.00$ at $\lambda_0=3.2$ cm., said binder being butadiene acrylonitrile rubber containing 33% acrylonitrile and said mixed crystal consisting of 85% by weight of $2FeO.3Fe_2O_3$ and 15% by weight of $ZnO.Fe_2O_3$, and said absorber layer containing 19 parts by weight of said binder and 76 parts by weight of the mixed crystal.

References Cited

UNITED STATES PATENTS

| | | | |
|---|---|---|---|
| 2,951,247 | 8/1960 | Halpern et al. | 343—18 |
| 2,992,425 | 7/1961 | Pratt | 343—18 |
| 2,964,444 | 12/1960 | Lynn | 156—309 |
| 3,026,229 | 3/1962 | Wilcox | 156—309 |
| 2,148,526 | 2/1939 | Brillhart | 117—104 |
| 2,948,639 | 8/1960 | Price | 117—104 |
| 2,923,934 | 2/1960 | Halpern | 343—18 |

RICHARD A. FARLEY, Primary Examiner

B. L. RIBANDO, Assistant Examiner